United States Patent [19]
Keeler et al.

[11] Patent Number: 5,344,184
[45] Date of Patent: Sep. 6, 1994

[54] METHOD AND APPARATUS FOR RESTRAINING A VEHICLE OCCUPANT

[75] Inventors: Laurence H. Keeler, Washington; Robert E. Resh, Dryden; Susan A. Richards, Sterling Heights, all of Mich.

[73] Assignee: TRW Vehicle Safety Systems Inc., Lyndhurst, Ohio

[21] Appl. No.: 170,698

[22] Filed: Dec. 21, 1993

[51] Int. Cl.$^5$ .............................................. B60R 21/22
[52] U.S. Cl. ................................ 280/730 R; 280/732; 280/753
[58] Field of Search ............... 280/728 B, 730 R, 732, 280/741, 743, 751, 752, 753

[56] References Cited
U.S. PATENT DOCUMENTS

| | | | |
|---|---|---|---|
| 3,618,978 | 11/1971 | Klove, Jr. et al. | 280/730 R |
| 3,702,706 | 11/1972 | Sobkow | 280/730 R |
| 3,794,349 | 2/1974 | Fuller | 280/732 |
| 3,904,222 | 9/1975 | Bursott et al. | 280/732 |
| 3,966,227 | 6/1976 | Cameron | 280/752 |
| 4,198,075 | 4/1980 | Kob et al. | 280/728 B |
| 4,427,215 | 1/1984 | Weichenrieder et al. | 280/752 |
| 4,948,168 | 8/1990 | Adomeit et al. | 280/732 |

*Primary Examiner*—Kenneth R. Rice
*Attorney, Agent, or Firm*—Tarolli, Sundheim & Covell

[57] ABSTRACT

An apparatus (10) for restraining a vehicle occupant comprises an air bag assembly having a center of gravity (70) and including a container (20), an air bag (42), and an inflator (50). The air bag assembly is pivotally mounted to an instrument panel (16) of the vehicle with a pivot axis (90) offset from the center of gravity (70). The air bag assembly has a stored position and an operative position and is pivotable from the stored position to the operative position. Thrust produced upon inflation of the air bag pivots the air bag assembly. The apparatus further includes a knee blocking member (36) secured to a side (24) of the container (20) of the air bag assembly. When the assembly moves from the stored position to the operative position, the knee blocking member (36) moves to an occupant restraining position. An actuator (110, 116) is operatively mounted to the air bag assembly and the instrument panel (16) for, when actuated, applying a moment to the air bag assembly to pivot the air bag assembly from the stored position to the operative position.

27 Claims, 5 Drawing Sheets

METHOD AND APPARATUS FOR RESTRAINING A VEHICLE OCCUPANT

TECHNICAL FIELD

The present invention is directed to a vehicle occupant restraining system and is particularly directed to a method and apparatus for deploying an occupant knee blocker and air bag restraining device.

BACKGROUND OF THE INVENTION

Vehicle occupant restraining systems are known in the art. Such systems include an air bag and a crash sensor for detecting the occurrence of a vehicle crash condition requiring deployment of the air bag. Upon the occurrence of a vehicle crash condition requiring deployment of the air bag, the crash sensor provides an electrical signal indicative of the crash condition. A crash sensor in a restraining system may be an actuatable switch, an inertia switch, and/or an accelerometer.

When the crash sensor provides the electrical signal indicative of the occurrence of a vehicle crash condition requiring deployment of an air bag, an electric current of predetermined magnitude and duration is passed through a squib, i.e., an electrically actuatable igniter, for the purpose of igniting the squib. The squib, when ignited, actuates a source of inflation fluid to direct inflation fluid into the air bag which results in inflation of the air bag.

Actuatable vehicle occupant knee blocker restraining systems are also known in the art. An occupant knee blocker is located at the lower portion of the vehicle's instrument panel and is movable from a stored position to an operative, knee blocking position in response to detection of a vehicle crash condition. Knee blocker restraining systems have been developed that combine an inflatable occupant air bag with a knee blocker. One such combined air bag and knee blocker restraining system is disclosed in U.S. Pat. No. 4,948,168.

SUMMARY OF THE INVENTION

The present invention provides a method and apparatus for restraining a vehicle occupant. The present invention includes a knee blocker and air bag assembly that is pivotable from a stored position to an operative vehicle occupant restraining position in response to thrust developed by a release of pressurized fluid. When in the operative restraining position, the knee blocker and air bag assembly acts against the occupant's knees to restrain movement of the occupant's lower torso. The pressurized fluid also inflates an air bag to restrain the occupant's upper torso and head. An actuator is operatively connected between the knee blocker and air bag assembly and the vehicle's instrument panel. The actuator assists the pivotal movement of the knee blocker and air bag assembly into the operative restraining position.

In accordance with one aspect of the present invention, an apparatus for restraining a vehicle occupant includes a container having a source of pressurized fluid and at least one fluid discharge opening. The source of pressurized fluid releases pressurized fluid in response to a deployment signal. The pressurized fluid, when released, passes through the at least one fluid discharge opening of the container thereby creating a force vector in a first direction. The apparatus further includes mounting means mounting the container to an instrument panel of the vehicle for pivotal movement about a pivot axis offset from the force vector so that the force vector pivots the container about the pivot axis from a stored position to a restraining position. Restraining means are secured to the container for restraining movement of an occupant when the container pivots to the restraining position.

In accordance with another aspect of the present invention, a method for restraining a vehicle occupant includes the step of pivotally mounting an occupant restraining device to an instrument panel of the vehicle about a pivot axis. The method also includes the step of mounting a source of pressurized fluid within the occupant restraining device. The method further includes the step of releasing the pressurized fluid in a direction offset from the pivot axis in response to a deployment signal. The releasing of the inflation fluid produces a moment causing the occupant restraining device to pivot to an occupant restraining position. The method still further includes the step of providing a linear actuator connected between the instrument panel and the restraining device so that when the linear actuator is actuated, it aids in pivoting the occupant restraining device to the occupant restraining position. The linear actuator is actuated in response to the deployment signal.

In accordance with a preferred embodiment of the present invention, an apparatus for restraining a vehicle occupant comprises an air bag. The air bag is mounted in a container. A source of inflation fluid is also mounted in the container. The source of inflation fluid includes at least one fluid discharge opening for directing inflation fluid in a first direction and into the air bag. Inflation fluid discharged from the at least one fluid discharge opening (i) inflates the air bag and (ii) provides a force vector in a second direction opposite the first direction. Mounting means is provided for mounting the container to an instrument panel of the vehicle for pivotal movement about a pivot axis offset from said force vector. The container has a stored position and an operative restraining position and is pivotable from the stored position to the operative restraining position. The force vector results in a moment being applied to pivot the container about the pivot axis. The applied moment pivots the container from the stored position to the operative restraining position, and permits the air bag to inflate to an occupant restraining position.

The apparatus of the preferred embodiment further includes a knee blocking member secured to the container. When the container pivots from the stored position to the operative restraining position, the knee blocking member is moved to an occupant knee blocking position. Linear actuator means is operatively associated with the container and the instrument panel for, when actuated, applying a moment to the container. This aids in the pivotal movement of the container from the stored position to the operative restraining position. The linear actuator means includes a piston reciprocally mounted in a cylindrical housing and an actuatable gas source responsive to the deployment signal for providing gas. The gas extends the piston relative to the housing, which causes the container to pivot to the restraining position. The linear actuator further includes scissor arms having distal ends operatively connected to the instrument panel and to the container. The proximal ends of the scissor arms are connected to an end of the piston. Extension of the piston spreads apart the distal ends of the scissor arms. The scissor arms and the piston are dimensioned such that the scissor arms are substantially coaxial when the piston reaches its fully extended position.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which:

FIG. 8 is a sectional view of a pivot arm assembly shown in FIG. 1 taken along line 8—8 of FIG. 2.

DESCRIPTION OF PREFERRED EMBODIMENTS

Figure 1:
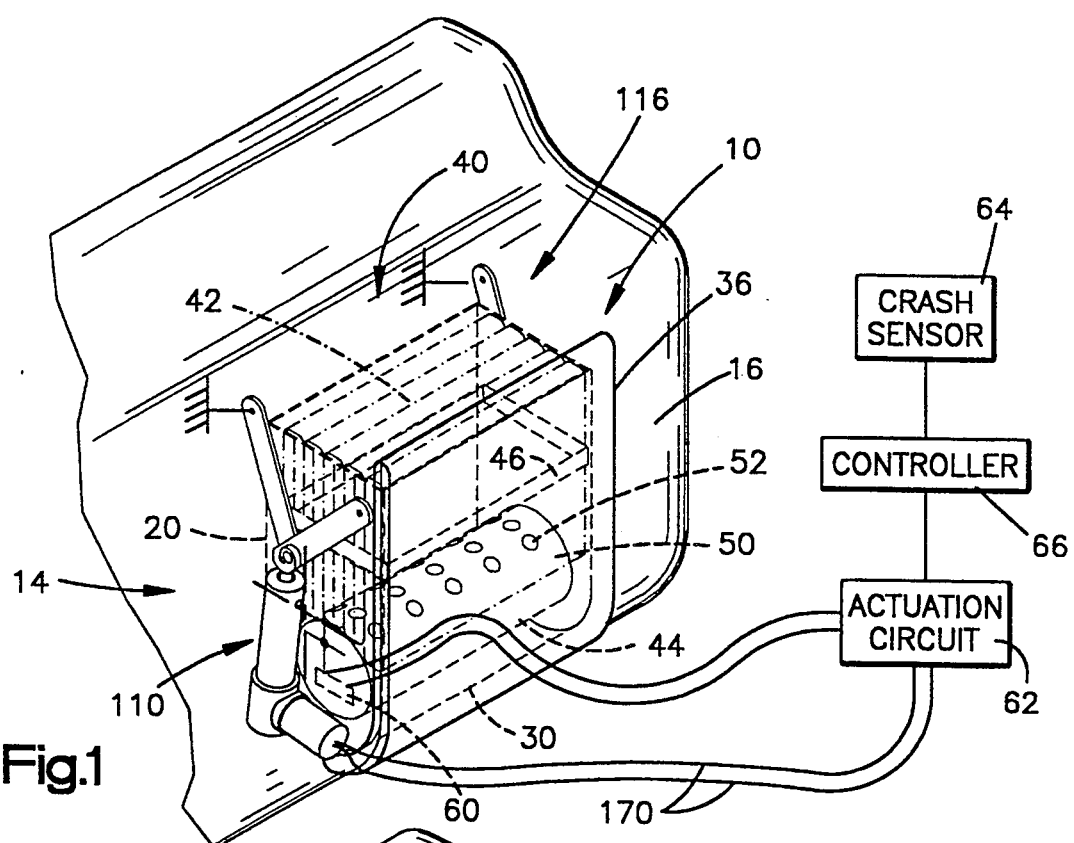
FIG. 1 is a schematic diagram of a knee blocker and air bag assembly made in accordance with the present invention shown in a stored position.
Figure 2:
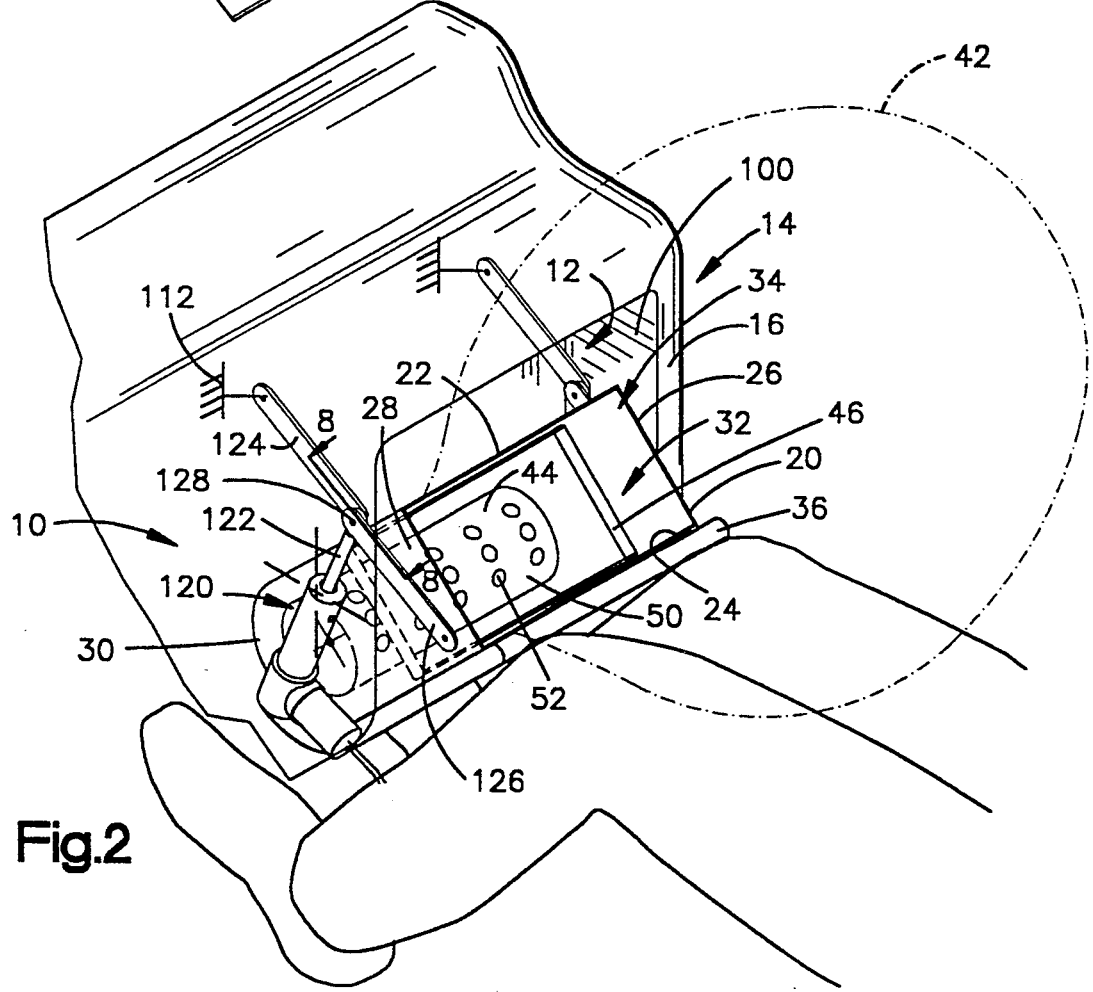
FIG. 2 is a schematic diagram of the assembly of FIG. 1 shown in an operative restraining position.

Referring to FIGS. 1 and 2, a knee blocker and air bag assembly 10 is mounted in an opening 12 of a lower portion 14 of a vehicle instrument panel 16. The assembly 10 includes a container 20 having side walls 22, 24, 26, 28 and a bottom wall 30. The side walls of the container 20 form a cavity 32 having an upper opening 34. A knee blocker cushion 36 is secured to the side wall 24, which is the side wall adjacent the occupant.

An air bag module 40 is located in the cavity 32 of the container 20 and includes an air bag 42 and an inflator assembly 44. The air bag 42 is folded into a predetermined configuration and is secured to the side walls 22, 24, 26, 28 using a retaining ring 46. The air bag 42 is in fluid communication with the inflator assembly 44.

The inflator assembly 44 includes a cylindrical outer housing 50 with a plurality of fluid discharge openings 52 arranged to direct an inflation fluid, which is preferably an inert gas, into the air bag 42. The inflator assembly 44 further includes a squib 60 electrically connected to an actuation circuit 62. The squib is operatively coupled to a source of inflation fluid, such as a combustible gas generating material and/or a container of pressurized gas, located in the housing 50.

A crash sensor 64, such as an inertia switch or an accelerometer, is electrically connected to a controller 66. The controller 66 is preferably a microcontroller. The controller 66 is connected to the actuation circuit 62. Upon detection of a crash condition requiring occupant restraint, as sensed by the crash sensor 64, the controller 66 controls the actuation circuit 62 so that the actuation circuit passes an electrical current of sufficient magnitude and duration through the squib 60 to ignite the squib. When the squib is ignited, inflation fluid, preferably an inert gas, is provided by, for example, ignition of a gas generating material and/or piercing of a container of pressurized gas disposed in the inflator housing 50. The released inflation fluid inflates the air bag 42.

The knee blocker and air bag assembly 10 has a center of gravity located on an axis 70 (FIG. 3) that extends from the side wall 28 to side wall 26 of the container 20 with the axis 70 being substantially perpendicular to the side walls 26, 28. A frame 74 is secured to the side walls 26, 28 of the container 20 by appropriate means, such as welding.

The opening 12 of the instrument panel 16 is defined by an upper wall 96, a back wall 98, and side walls 100, 102. Stub shafts 78, 80 (FIG. 6) extend from the frame 74 and are received in shaft receiving bores 82, 84, respectively, in the walls 100, 102, respectively, of the instrument panel 16. The stub shafts 78, 80 define a mounting axis 90 that is substantially parallel with the center of gravity axis 70.

Figure 3:
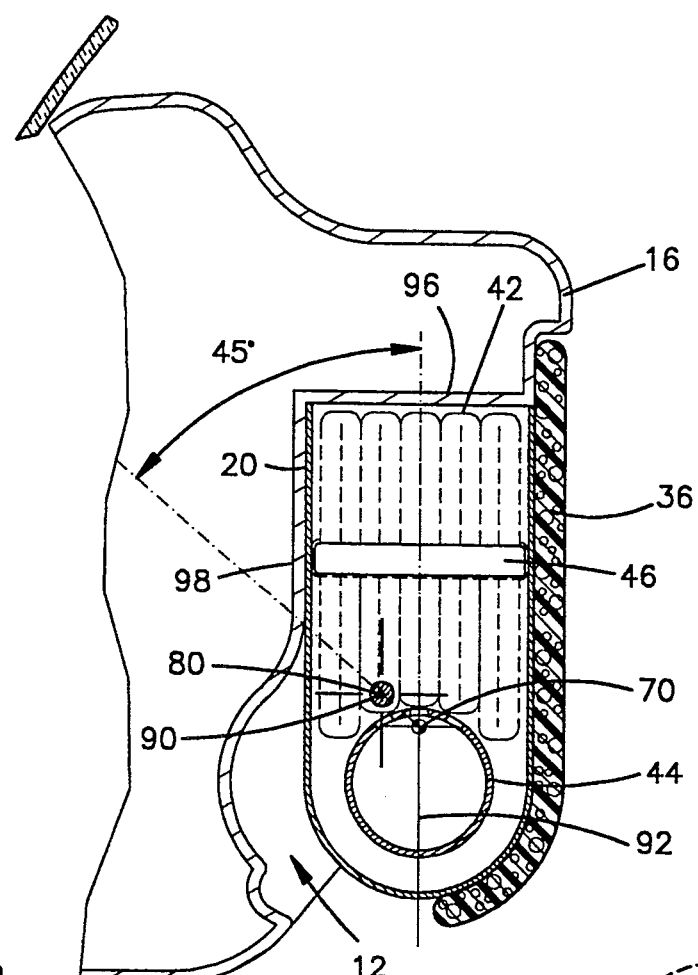
FIG. 3 is a side view, partly in section, of the assembly of FIG. 1 with certain parts removed for clarity.

When the knee blocker and air bag assembly 10 is in its fully stored position, as shown in FIG. 3, the mounting axis 90 is offset from the center of gravity axis 70. Specifically, the mounting axis 90 is preferably located 45 degrees upward and forward (relative to the front of the vehicle) of the center of gravity axis 70. As a result, the mass of the knee blocker and air bag assembly 10, which acts through its center of gravity, applies a moment about the stub shaft mounting axis 90 in a direction tending to pivot the assembly 10 clockwise about axis 90 as viewed in FIG. 3.

A vertical center line 92 through the center of the inflator assembly 44 is offset from the mounting axis 90. The fluid discharge openings 52 are substantially symmetric about the center line 92 and are directed substantially upward. When the gas is rapidly discharged through the openings 52, a downward thrust occurs. The force vector of the thrust is offset from the mounting axis 90. The downward thrust increases the moment about the mounting axis 90 so as to pivot the knee blocker and air bag assembly 10 about the mounting axis 90 in a direction that moves the assembly 10 to an operative restraining position, shown in FIG. 4.

The knee blocker and air bag assembly 10 further includes a first actuator assembly 110 mounted to the frame 74 and operatively connected between a fixed, reinforced member 112 in the vehicle instrument panel 16 and sidewall 28 of the container 20. A second actuator 116 is mounted to the frame 74 and is operatively connected between the fixed, reinforced member 112 of the vehicle instrument panel 16 and sidewall 26 of the container 20. The actuators 110, 116 are similar in structure and function and, for simplicity, only one is described in detail.

Figure 5:
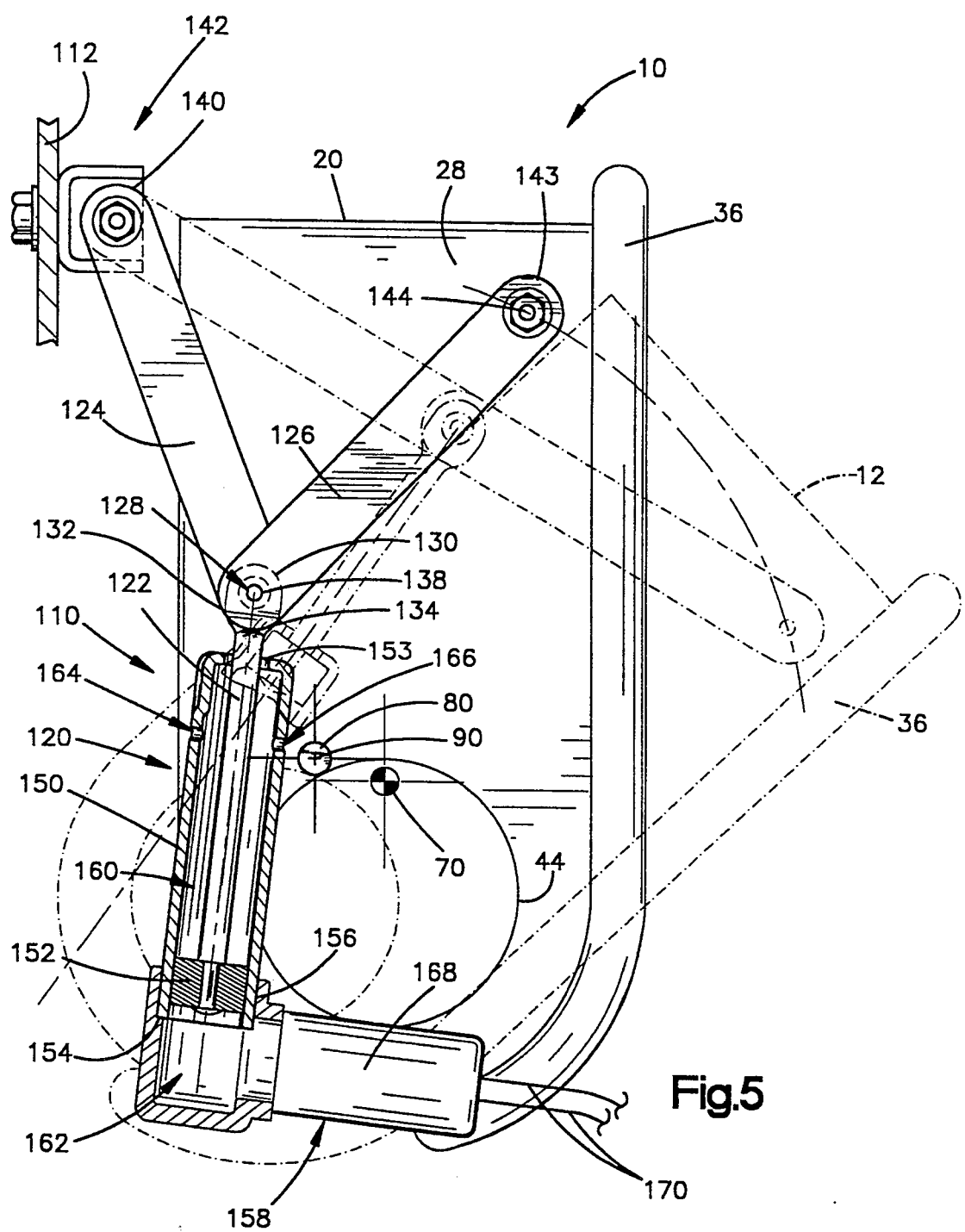
FIG. 5 is a side view of a portion of the assembly of FIG. 1 showing in solid lines an actuator member in a stored position and showing in dotted lines the actuator member in an operative restraining position.
Figure 6:
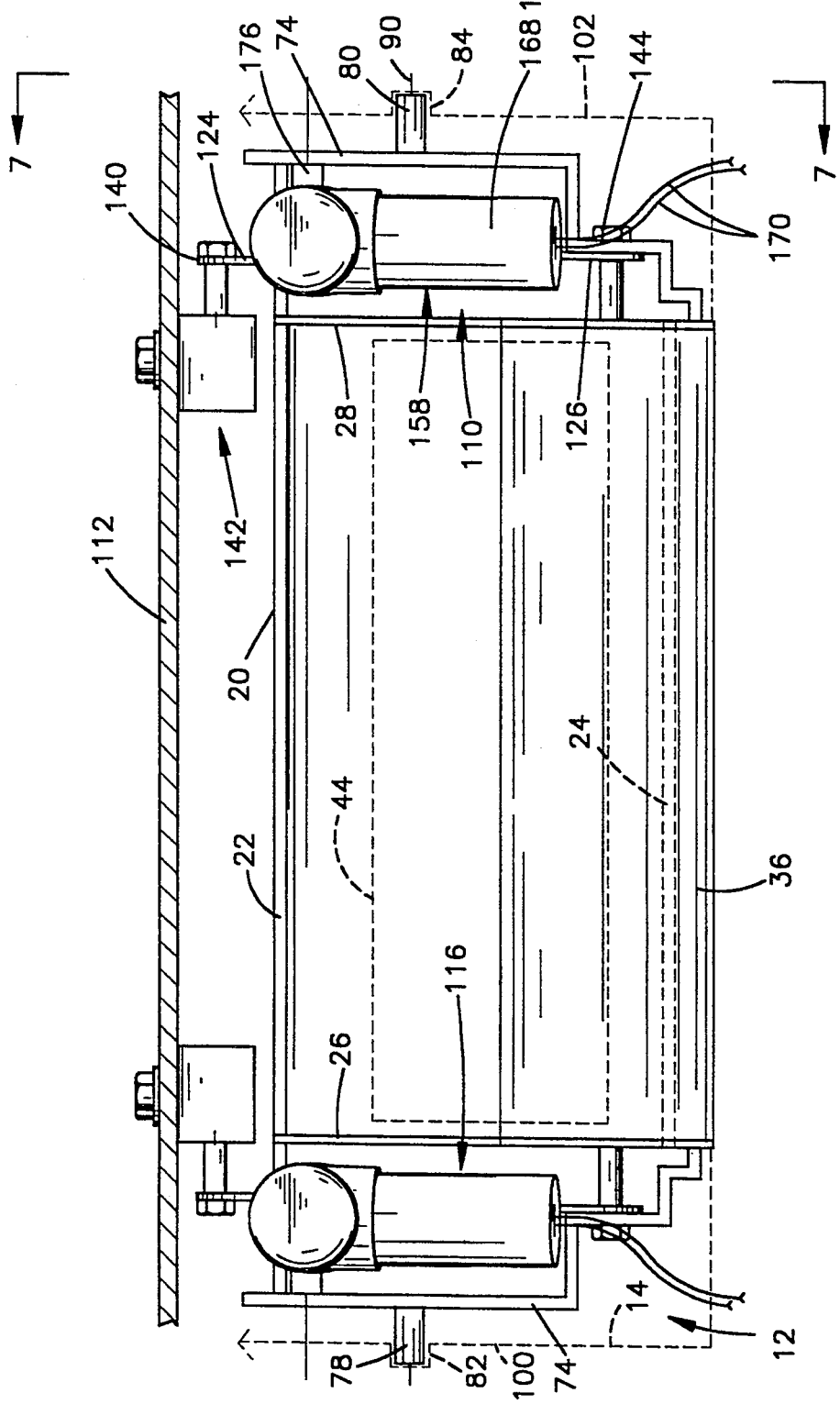
FIG. 6 is a view of the assembly of FIG. 1 taken along line 6—6 of FIG. 7.
Figure 7:
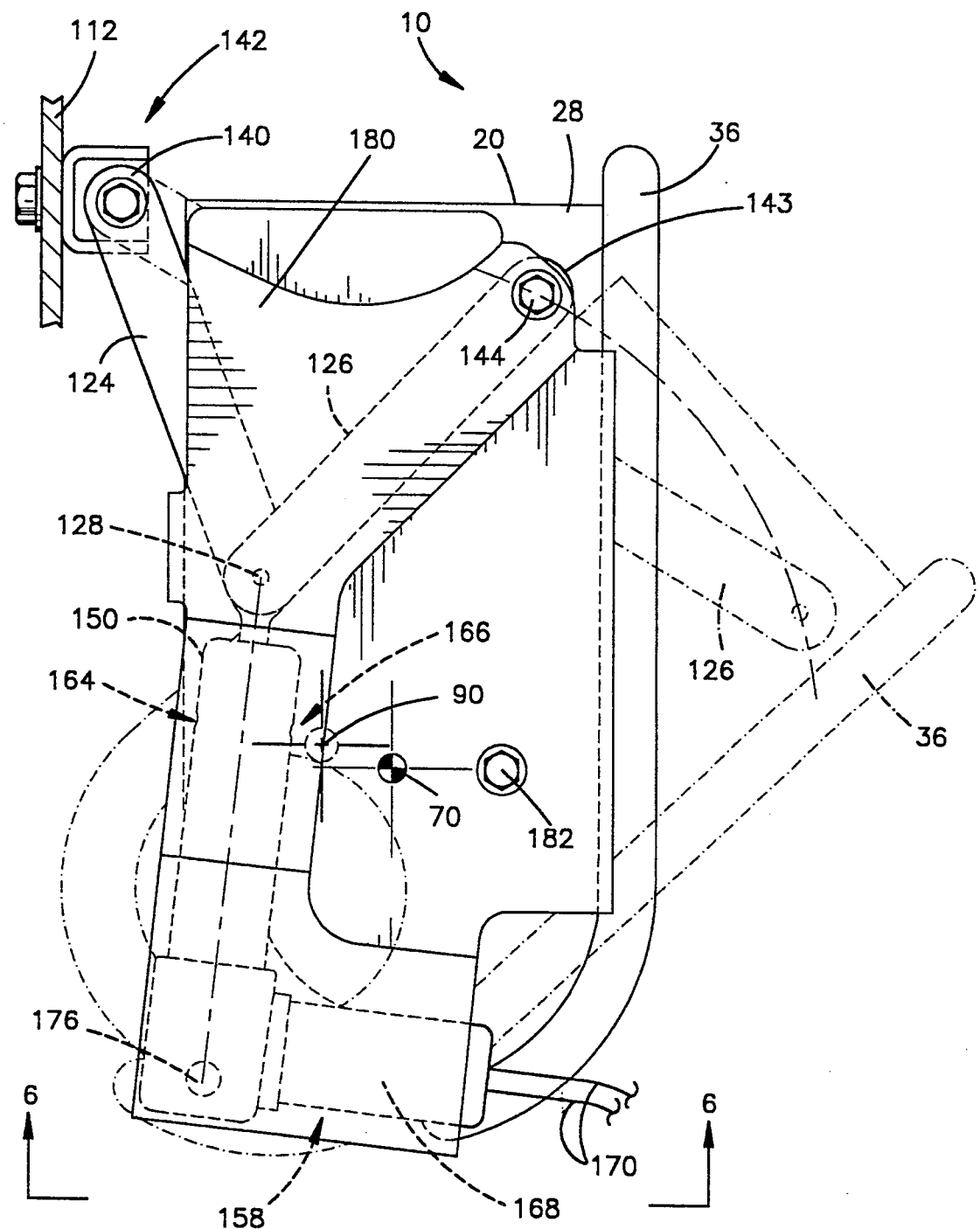
FIG. 7 is a side view of the assembly of FIG. 1 taken along line 7—7 of FIG. 6.

The actuator assembly 110 (FIG. 5) includes a fluid actuatable ram assembly or linear actuator 120 secured to a gas generating assembly 158 by suitable means such as welds. The gas generating assembly is, in turn, secured to the frame 74 by a bolt 176 (FIG. 6). The fluid actuated ram assembly 120 includes a piston head 152 and piston arm 122 slidably mounted in a cylindrical housing 150. The piston arm 122 is operatively connected to scissor arms 124, 126 at a pivot connection 128. Specifically, an end 130 of piston arm 122 extends through one end 153 of the cylindrical housing 150. The end 130 of the piston arm 122, a first or proximal end 132 of scissor arm 124, and a first or proximal end 134 of scissor arm 126 are pivotally secured together with a pivot pin 138. A second or distal end 140 of scissor arm 124 is pivotally secured to the fixed, reinforced member 112 of the dashboard 16 by a bracket assembly 142. A second or distal end 143 of scissor arm 126 is pivotally secured to the side wall 28 of the container 20 by a bolt 144.

The other end of piston arm 122 is secured to the piston head 152, which slides in the housing 150. A second end 154 of the cylindrical housing 150 is secured to a cylindrical opening 156 of a gas generator assembly 158. The piston head 152 divides the cylindrical housing 150 and a portion of the gas generator assembly 158 into a first chamber 160 and a second chamber 162. Chamber 160 is in communication with atmosphere through vent holes 164, 166.

The gas generating assembly 158 includes a source 168 of pressurized gas, such as a gas generating material and/or a pressurized gas bottle in fluid communication with the chamber 162. The gas generating assembly is electrically connected to the actuation circuit 62 through wires 170. When the knee blocker and air bag assembly 10 is in a stored condition, the piston head 152 and piston arm 122 are in a fully retracted position in the housing 150. When the piston head and piston are in a fully retracted position, the scissor arms 124, 126 assume a V-shaped "closed" condition as shown in FIGS. 1 and 5. In the closed condition, the scissor arms 124, 126 hold the knee blocker and air bag assembly 10 in a closed, non-operative position. The piston head 152 and piston arm 122 are held in a retracted position because any attempted movement of piston head 152 would be resisted by the partial vacuum that would be produced in chamber 162 by such attempted movement.

When the gas generating assembly 158 is actuated, pressurized gas enters chamber 162 and moves the piston head 152 and piston arm 122 upward toward a fully extended position. As the piston arm 122 moves upward, the scissor arms 124, 126 move apart from a V-shape toward a shape in which they extend in opposite directions from pivot connection 128. Movement of the scissor arms 124, 126 toward their "open" position results in the pivoting of the container 20 toward the occupant. The lengths of the piston arm 122 and the scissor arms 124, 126 and the amount of gas provided by the gas source 168 are selected so that the scissor arms 124, 126 extend to a fully open condition as shown in FIG. 2 and in phantom in FIG. 5 when the piston arm 122 is fully extended. When the piston rod 122 is fully extended, the scissor arms 124, 126 are substantially coaxial.

As the piston head 152 moves upward, the air in chamber 160 readily escapes through vent holes 164, 166. The gas pressure remains in the chamber 162 to retain the piston arm 122 in its extended position. Once the scissor arms 124, 126 are in a fully opened position, only a small amount of force is needed to retain the piston arm 122 in the fully extended position. In particular, any force vector that will be applied downward along the piston arm 122 as a result of a load applied to the pad 36, such as by an occupant's knees hitting the pad 36, is substantially zero.

The gas generating assembly 158 pivots with the frame 74 about the mounting axis 90 of the knee blocker and air bag assembly 10 when the assembly 10 moves from a stored position to an open or operative restraining position. A cover 180 is secured to side wall 28 by a bolt 182. The cover 180 is in a holster shape and covers the actuator 110. A similar cover (not shown) covers the actuator 116.

Figure 4:
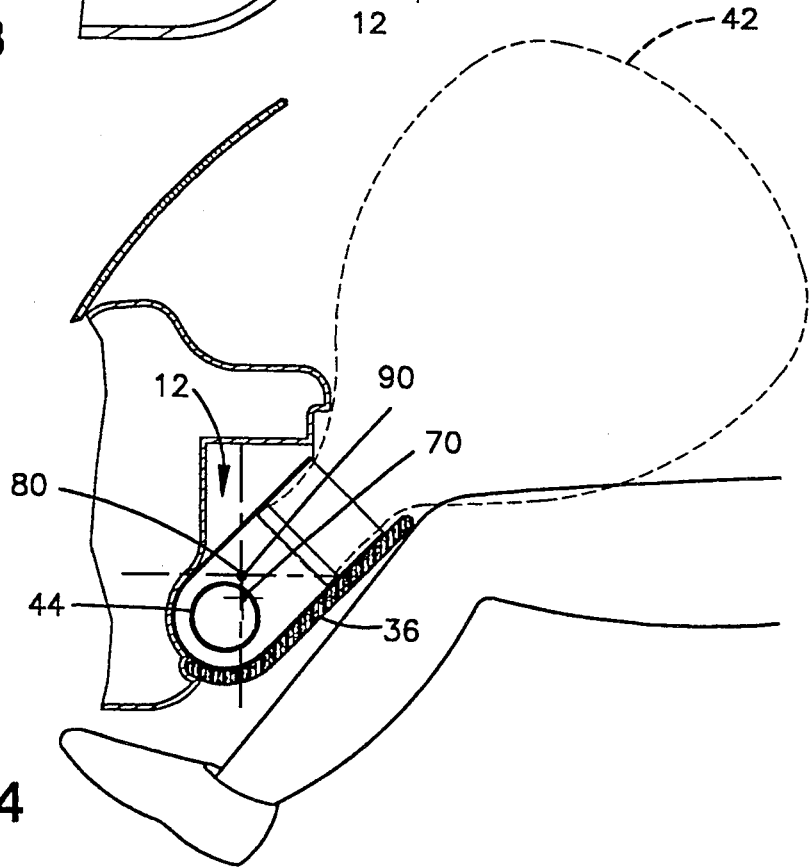
FIG. 4 Is a side view of the assembly of FIG. 2 with certain parts removed for clarity.

When controller 66 receives a signal from the crash sensor 64, the controller actuates the inflator assembly 44 and simultaneously actuates the actuator assemblies 110, 116. The thrust developed by the gas escaping through the fluid discharge openings 52, in combination with the opening of the scissor arms of the actuator assemblies 110, 116, causes the assembly 10 to rotate about the mounting axis 90 to an operative restraining position as shown in FIG. 2 and FIG. 4. The gas escaping through the fluid discharge openings 52 inflates the air bag 42 to a restraining position to restrain movement of the upper torso of the occupant. The knee blocking pad 36 is positioned to contact the occupant's knees and restrain the occupant's lower torso.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus for restraining a vehicle occupant comprising:

a container with at least one fluid discharge opening;

a source of pressurized fluid in said container, said pressurized fluid being released in response to a deployment signal, said released pressurized fluid passing through said at least one fluid discharge opening and thereby creating a force vector;

pivotal mounting means for mounting said container to the vehicle for pivotal movement about a pivot axis offset from said force vector so that said force vector acts to pivot said container from a stored position to an occupant restraining position; and restraining means secured to said container for restraining movement of the vehicle occupant when said container pivots to said occupant restraining position.

2. The apparatus of claim 1 wherein said restraining means includes a knee blocking member secured to a side of said container presented toward the vehicle occupant, said knee blocking member moving to an occupant knee blocking position when said container pivots to said occupant restraining position.

3. The apparatus of claim 1 wherein said restraining means includes an air bag stored in said container and operatively coupled to said source of said pressurized fluid so that said released pressurized fluid inflates said air bag to an operative, occupant restraining position.

4. The apparatus of claim 3 wherein said restraining means includes a knee blocking member secured to a side of said container presented toward the vehicle occupant, said knee blocking member being moved to an occupant knee blocking position when said container pivots to said restraining position.

5. The apparatus of claim 1 further including crash sensor means for providing said deployment signal upon the occurrence of a vehicle crash condition requiring said restraining means to restrain a vehicle occupant.

6. The apparatus of claim 1 further including actuator means operatively coupled between said instrument panel and said container for applying a force to said container in a direction to pivot said container to said restraining position in response to said deployment signal.

7. The apparatus of claim 6 wherein said actuator means includes a piston reciprocally mounted in a housing, and an actuatable means responsive to said deployment signal for providing pressurized fluid to move said piston to an extended position relative to said housing, movement of said piston to its extended position pivoting said container to said restraining position.

8. The apparatus of claim 7 wherein said actuator means further includes scissor arms having distal ends operatively connected to said instrument panel and to said container and proximal ends connected to an end of said piston, movement of said piston toward its extended position spreading apart the distal ends of said scissor arms.

9. The apparatus of claim 8 wherein said scissor arms and said piston are dimensioned such that said scissor arms are substantially coaxial when the piston reaches its extended position.

10. The apparatus of claim 9 wherein said restraining means includes a knee blocking member secured to a side of said container presented toward the vehicle occupant, said knee blocking member being moved to an occupant knee blocking position when said container pivots to said restraining position.

11. The apparatus of claim 9 wherein said restraining means includes an air bag stored in said container and operatively coupled to said source of said pressurized fluid so that said released pressurized fluid inflates said air bag to an operative, occupant restraining position.

12. The apparatus of claim 11 wherein said restraining means includes a knee blocking member secured to a side of said container presented toward the vehicle occupant, said knee blocking member being moved to an occupant knee blocking position when said container pivots to said restraining position.

13. The apparatus of claim 9 further including crash sensor means for providing said deployment signal upon the occurrence of a vehicle crash condition requiring said restraining means to restrain a vehicle occupant.

14. An apparatus for restraining a vehicle occupant, said apparatus comprising:
a container pivotally mounted in an instrument panel of the vehicle, said container having a stored position and being pivotable to an open, occupant restraining position; and
actuator means operatively coupled between said instrument panel and said container and responsive to a deployment signal for applying a force to said container in a direction to pivot said container to said occupant restraining position in response to said deployment signal, said actuator means including a piston reciprocally mounted in a housing, an actuatable means responsive to said deployment signal for providing pressurized fluid to move said piston to an extended position relative to said housing, movement of said piston to its extended position pivoting said container to said occupant restraining position, and scissor arms having distal ends operatively connected to said instrument panel and said container and proximal ends connected to an end of said piston, said movement of said piston toward its extended position spreading apart the distal ends of said scissor arms.

15. The apparatus of claim 14 wherein said scissor arms and said piston are dimensioned such that said scissor arms are substantially coaxial when the piston reaches its extended position.

16. The apparatus of claim 14 further comprising restraining means secured to said container for restraining movement of the vehicle occupant when said container pivots to said occupant restraining position, said restraining means includes a knee blocking member secured to a side of said container presented toward the vehicle occupant, said knee blocking member being moved to an occupant knee blocking position when said container pivots to said restraining position.

17. The apparatus of claim 14 further comprising restraining means secured to said container for restraining movement of the vehicle occupant when said container pivots to said occupant restraining position, said restraining means includes an air bag stored in said container and operatively coupled to a source of pressurized fluid so that release of said pressurized fluid inflates said air bag to an operative, occupant restraining position.

18. The apparatus of claim 17 wherein said restraining means includes a knee blocking member secured to a side of said container presented toward the vehicle occupant, said knee blocking member being moved to an occupant knee blocking position when said container pivots to said operative position.

19. An apparatus for restraining a vehicle occupant comprising:
an air bag assembly including a container having an air bag and actuatable means for providing inflation fluid mounted in said container, said actuatable means including at least one fluid discharge opening for directing provided inflation fluid in a first direction, said at least one fluid discharge opening being in fluid communication with said air bag, said inflation fluid directed from said at least one fluid discharge opening (i) inflating said air bag and (ii) providing a force vector in a second direction opposite said first direction;
mounting means for pivotally mounting said air bag assembly to an instrument panel of the vehicle with a pivot axis offset from said force vector, said air bag assembly having a stored position and an operative restraining position and being pivotable from said stored position to said operative restraining position, said force vector applying a moment to said air bag assembly about said pivot axis so as to pivot said air bag assembly from said stored position to said operative restraining position thereby permitting said air bag to inflate to an occupant restraining position; and
a knee blocking member secured to a side of said container presented toward the vehicle occupant, said knee blocking member being moved to an occupant knee blocking position when said assembly pivots from said stored position to said operative restraining position.

20. The apparatus of claim 19 further including:
actuator means operatively coupled between said air bag assembly and said instrument panel for, when actuated, applying a moment to said air bag assembly so as to aid in said pivotal movement of said air bag assembly from said stored position to said operative restraining position.

21. The apparatus of claim 20 wherein said actuator means includes a piston reciprocally mounted in a housing, and an actuatable gas providing means responsive to said deployment signal for providing gas to move said piston to an extended position relative to said housing, movement of said piston to its extended position pivoting said air bag assembly to said operative restraining position.

22. The apparatus of claim 21 wherein said actuator means further includes scissor arms having distal ends operatively connected to said instrument panel and to said container and proximal ends connected to an end of said piston, movement of said piston toward its extended position spreading apart the distal ends of said scissor arms.

23. The apparatus of claim 20 wherein said scissor arms and said piston are dimensioned such that said scissor arms are substantially coaxial when the piston reaches the extended position.

24. An apparatus for restraining a vehicle occupant comprising:
   an air bag assembly including a container, an air bag, and a source of inflation fluid for the air bag, said air bag assembly having a center of gravity;
   mounting means for pivotally mounting said air bag assembly to an instrument panel of the vehicle with a pivot axis offset from said center of gravity, said air bag assembly having a stored position and an operative restraining position and being pivotable from said stored position to said operative restraining position;
   a knee blocking member secured to a side of said container presented toward the vehicle occupant, said knee blocking member being moved to an occupant knee blocking position when said assembly member pivots from said stored position to said operative restraining position; and
   actuator means operatively mounted to said air bag assembly and to said instrument panel for, when actuated, applying a moment to said air bag assembly so as to pivot said air bag assembly from said stored position to said operative restraining position.

25. The apparatus of claim 24 wherein said actuator means includes an actuatable fluid providing means and a fluid actuatable ram operatively connected between said air bag assembly and said instrument panel, said ram having a retracted position in which said ram holds said air bag assembly in said stored position and an extended position in which said ram pivots said air bag assembly to said operative restraining position, said ram being moved from said retracted position to said extended position when said fluid providing means is actuated.

26. The apparatus of claim 25 further including crash sensing means electrically connected to said fluid providing means for actuating said fluid providing means upon detection of a vehicle crash condition.

27. A method for restraining a vehicle occupant including the steps of:
   mounting an occupant restraining device to the vehicle for pivotal movement about a pivot axis;
   providing a source of pressurized fluid for the occupant restraining device upon the occurrence of a vehicle crash condition requiring occupant restraint;
   discharging said pressurized fluid in response to a deployment signal in a direction offset from the pivot axis, to apply a moment to pivot the occupant restraining device to an occupant restraining position;
   providing an actuator connected between the vehicle and the restraining device so that when the actuator is actuated, it acts to pivot the occupant restraining device to the occupant restraining position; and
   actuating the actuator in response to said deployment signal.

* * * * *